(No Model.)

C. G. TREFETHEN.
CARRIAGE WASHING DEVICE.

No. 546,366. Patented Sept. 17, 1895.

WITNESSES
E. A. Woodbury
A. N. Bonney

INVENTOR
Charles G. Trefethen.
By his Att'y
Henry W. Williams

UNITED STATES PATENT OFFICE.

CHARLES G. TREFETHEN, OF TAUNTON, MASSACHUSETTS.

CARRIAGE-WASHING DEVICE.

SPECIFICATION forming part of Letters Patent No. 546,366, dated September 17, 1895.

Application filed December 24, 1894. Serial No. 532,777. (No model.)

*To all whom it may concern:*

Be it known that I, CHARLES G. TREFETHEN, a citizen of the United States, residing at Taunton, in the county of Bristol and State of Massachusetts, have invented a new and useful Improvement in Carriage-Washing Devices, of which the following is a specification.

This invention relates to that class of carriage-washing devices in which the water-supply pipe is sustained at a height above the top of the vehicle and supports pivotally a section of pipe adapted to be rotated in a horizontal plane, and having attached thereto a flexible hose whose nozzle or free end drops into a position in which it may be handled by a person on the floor and directed toward any portion of the carriage.

The nature of the invention is fully described below and illustrated in the accompanying drawings, in which—

Figure 1:
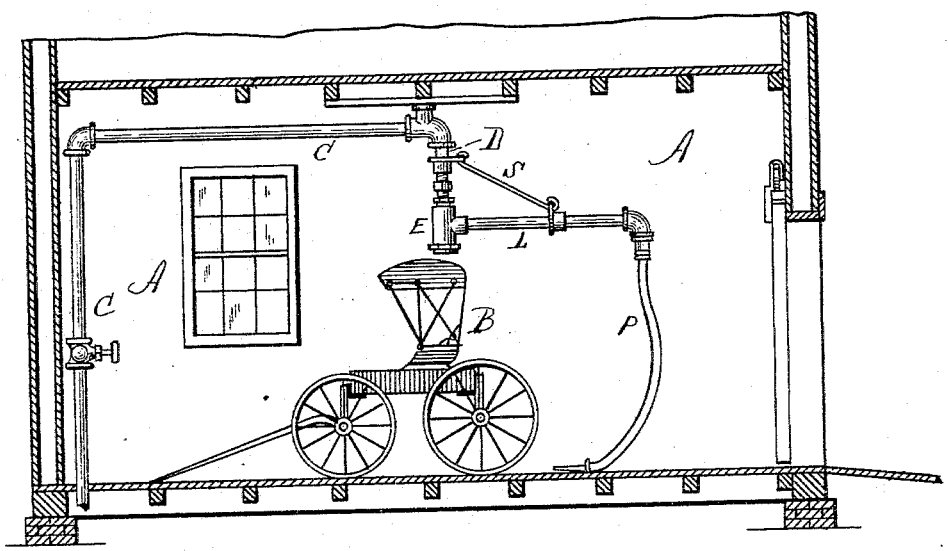
Figure 2:
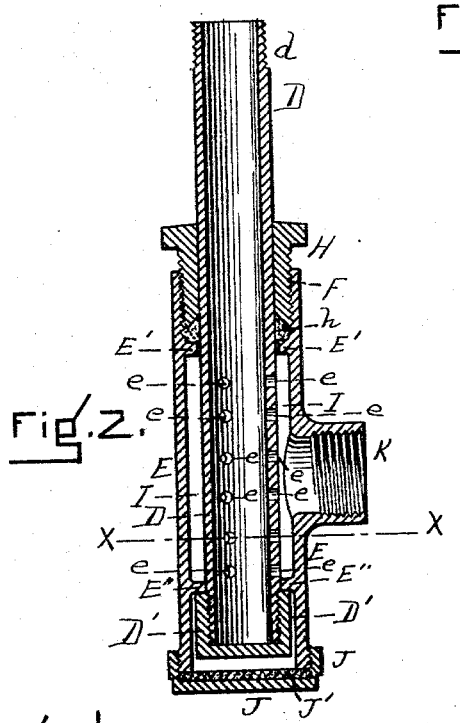
Figure 3:
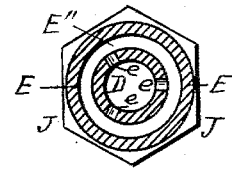

Figure 1 is a side elevation of my improved device in position for use within a room in a barn or structure shown in vertical section. Fig. 2 is an enlarged vertical section taken at the joint connecting the horizontally-rotating section and the vertical section of the supply-pipe to which it is pivotally secured. Fig. 3 is a horizontal section taken on line $x$, Fig. 2.

Similar letters of reference indicate corresponding parts.

A represents the interior of a barn or carriage-house, and B a buggy in position to be washed.

C C represent stationary sections of water-supply pipe, and D a vertically-hanging branch located at a convenient point in the carriage-house. This branch, which is screw-threaded at $d$ for the purpose of attaching it to the section C, is provided with numerous perforations near its lower end at $e$, and has screwed upon said lower end a cap D', thus effectually closing the end. This pipe D extends down into the vertical pipe E, which is provided with two internal flanges E' and E''. The lower flange E'' rests upon the upper edge of the cap D', such cap therefore serving as a support for the pipe E. The upper portion of this pipe E is internally screw-threaded at E, and a stuffing-nut H is screwed down into the upper end of the pipe E, between said pipe and the pipe D, the stuffing $h$ being between this nut and the upper flange E'. The flanges E' and E'' are of such diameter as to allow the pipe E to turn freely upon the pipe D, and said pipe E is of sufficient diameter to afford the annular space or chamber I around the pipe D and between the flanges E' E'', such space embracing that portion of the pipe D which is provided with the perforations $e$. The lower end of the pipe E is externally screw-threaded to receive the cap J, provided on its inner side with a suitable washer J'.

The pipe E is provided with a horizontal branch K, onto which is screwed the horizontal pipe L, to which is attached the upper end of a hose P, hanging to or toward the floor. A brace-rod S extends from the pipe L to a suitable ring on the pipe D.

The water enters the pipe D from the sections C and passes through the perforations $e$ into the annular space or chamber I, and thence through the branch K into and through the horizontal pipe L and hose P. The pipe E and its connections L P are supported by the pipe D, and directly by the upper edge of the cap D', screwed to the lower end thereof. The pipe E rotates freely upon the pipe D, having its bearings at the flanges E' E'', which are at a sufficient distance apart to impart steadiness and rigidity to the connection.

Having thus fully described my improvement, I do not claim, broadly, the idea of a horizontally pivotally branched pipe elevated above the height of a carriage and provided with a section of flexible hose, nor do I claim a single unbalanced horizontal pipe swinging or revolving around a pivotal point as broadly new in this invention.

What I claim, and desire to secure by Letters Patent, is—

The hereinbefore described improved carriage-washing device, consisting of the combination with the feed pipe C and horizontal pipe L, of the drop pipe D secured to and extending vertically down from the feed pipe, said drop pipe having its lower end closed by a cap the upper end of which constitutes a ledge or annular step upon the outside of said pipe, the external pipe E provided with the internal annular flanges E' E'' and the horizontal branch K for connection with said pipe L and closed at its lower end, and the stuffing nut H extending into the upper end of said pipe E around the pipe D and above the upper flange E', said pipe D being perforated so as to communicate with the annular chamber I located between the two said flanges of the pipe E, said flanges bearing on the pipe D and allowing the pipe to rotate thereon, and the lower flange resting upon the upper edge of said cap D', all constructed and arranged as and for the purpose set forth.

CHARLES G. TREFETHEN.

Witnesses:
E. A. WOODBURY,
HENRY W. WILLIAMS.